(No Model.)

R. D. MURRELL.
COMBINED HOE.

No. 284,883. Patented Sept. 11, 1883.

Witnesses:
Jas. E. Hutchinson.
Henry C. Hazard.

Inventor:
R. D. Murrell, by
Geo. S. Prindle, his Atty

UNITED STATES PATENT OFFICE.

RENE D. MURRELL, OF SOCIAL CIRCLE, GEORGIA.

COMBINED HOE.

SPECIFICATION forming part of Letters Patent No. 284,883, dated September 11, 1883.

Application filed January 18, 1883. (No model.)

*To all whom it may concern:*

Be it known that I, R. D. MURRELL, of Social Circle, in the county of Walton, and in the State of Georgia, have invented certain new and useful Improvements in Combined Hoes; and I do hereby declare that the following is a full, clear, and exact description thereof, reference being had to the accompanying drawings, making a part of this specification, in which—

Figure 1:
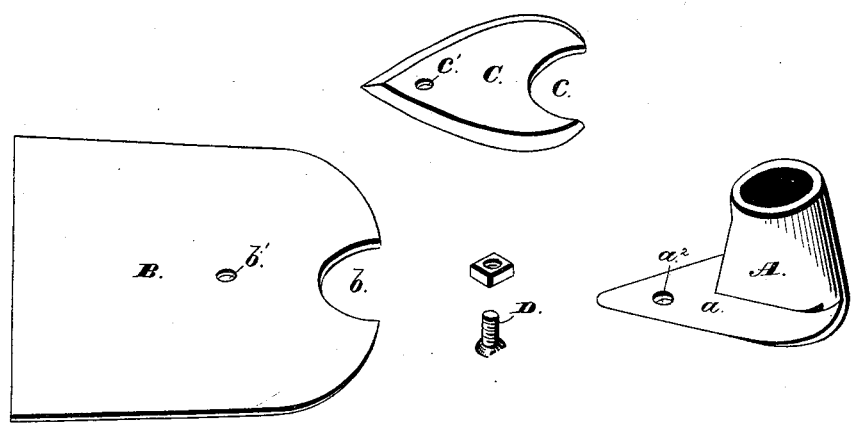
Figure 2:
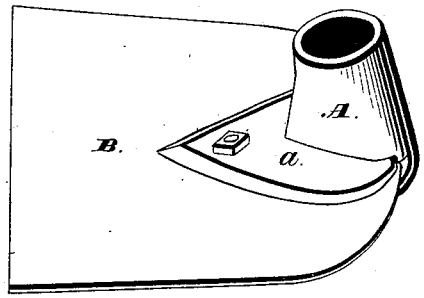
Figure 3:
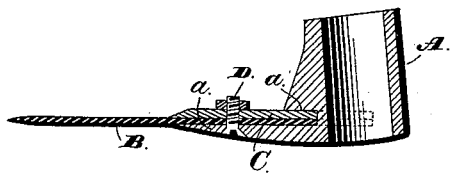

Figure 1 is a perspective view of the parts of my hoe separated from each other. Fig. 2 is a like view of the same as combined for use, and Fig. 3 is a central longitudinal section.

Letters of like name and kind refer to like parts in each of the figures.

The design of my invention is to enable several blades having different shapes to be used upon or in combination with one eye and handle; and to this end it consists in the construction and combination of parts, substantially as and for the purpose hereinafter specified.

In the annexed drawings, A represents a hoe-eye of ordinary form, to the lower end of which is secured a plate, $a$, that preferably has the form in plan view shown in Fig. 1, and is adapted to extend beneath a blade, B, in the usual manner. The front side of the eye A, at its lower end, is extended forward, as shown in Fig. 3, and between such extended part and the plate $a$ is provided a recess, $a'$, which vertically is about twice the thickness of the blade B, and horizontally extends rearward to the wall-line of said eye, the rear end of said recess having a curved form. The blade B has its rear end provided with a semicircular notch, $b$, which enables it to pass into the recess $a'$, and to fit closely around the front side of the eye A, while above said blade is placed a plate, C, that corresponds in general shape to the plate $a$, and is provided with a semicircular notch, $c$, at its rear end, which corresponds to said notch $b$ and enables said rear end to be contained within said recess. A bolt, D, passing through suitable coinciding openings, $a^2$, $b'$, and $c'$, respectively, in the plate $a$, blade B, and plate C, binds said parts firmly together and completes the device.

Any form of blade may be used in place of that shown, so that by use of one handle and eye all of the usual forms of hoe and rake may be produced, and a material saving in expense effected. In addition to the advantages named, the connection between the blade and eye is far stronger than has heretofore been produced, and the utensil described possesses materially greater durability than those usually employed.

I am aware that separately the supplemental plate and binding-bolt, and the recess for the reception of the rear end of the hoe-blade, are old, and therefore do not claim the same, broadly.

Having thus fully set forth the nature and merits of my invention, what I claim as new is—

The hereinbefore-described utensil, in which the eye A, provided with the plate $a$, recess $a'$, and opening $a^2$, the blade B, having the notch $b$ and opening $b'$, and the plate C, provided with the notch $c$ and opening $c'$, are combined with each other, and are secured together by means of the bolt D, substantially as and for the purpose specified.

In testimony that I claim the foregoing I have hereunto set my hand this 22d day of November, 1882.

RENE D. MURRELL.

Witnesses:
 JAS. L. PENNINGTON,
 ADIAL S. FLORENCE.